F. K. JENNINGS.
Plow.
No. 207,873.  Patented Sept. 10, 1878.
Fig. 1.
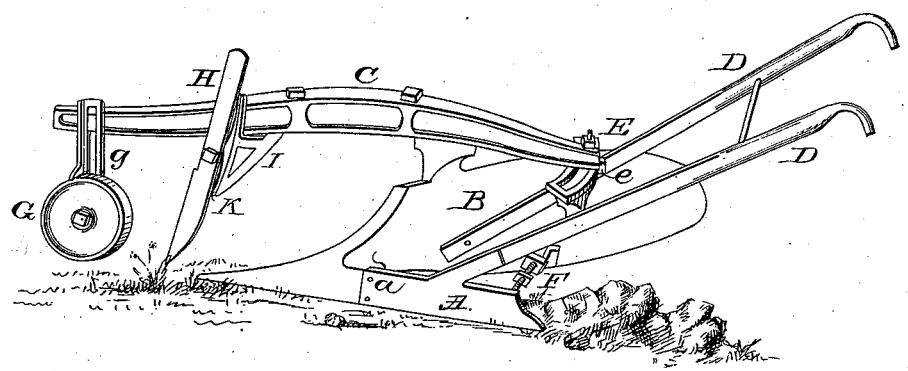
Fig. 2.
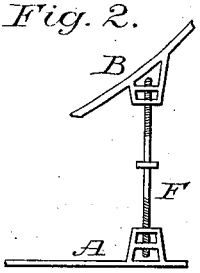
Fig. 3.
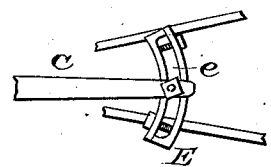
Fig. 4.
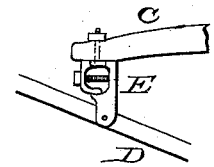
Fig. 5.
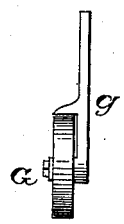
Fig. 6.
Fig. 7.
Witnesses:
Burt Brett
Asa Elisby
Inventor:
Frank K. Jennings
N. PETERS, PHOTO-LITHOGRAPHER, WASHINGTON, D. C.

UNITED STATES PATENT OFFICE.

FRANK K. JENNINGS, OF ASHTABULA, OHIO, ASSIGNOR OF ONE-HALF HIS RIGHT TO PHŒNIX IRON WORKS COMPANY, OF SAME PLACE.

IMPROVEMENT IN PLOWS.

Specification forming part of Letters Patent No. 207,873, dated September 10, 1878; application filed June 13, 1878.

*To all whom it may concern:*

Be it known that I, FRANK K. JENNINGS, of the city of Ashtabula, county of Ashtabula, and State of Ohio, have invented a new and useful Improvement in Plows, which improvement is fully set forth in the following specification, reference being had to the accompanying drawings.

The object of my invention is to make a plow adjustable for different kinds of plowing and soils—that is, for plowing greensward or loose soil, at pleasure, by means of devices, hereinafter described, for extending the land-side of the plow, and varying the width of the furrow at pleasure.

Figure 1 represents a perspective view of the left side of the plow. Fig. 2 represents a horizontal section of the main standard, with land-side attached to the same, showing the movable joint used in making the adjustment of the land-side. Fig. 3 is a plan view of the arc for adjusting the handles. Fig. 4 is a side view of the same as viewed on the right side of the plow. Fig. 5 is a rear view of the wheel. Fig. 6 is a front view of the colter connected with its brace. Fig. 7 is a view of the side of the shoe next the colter.

A is the land-side of the plow, connected by the joint $a$ to the main standard or short land-side; B, the mold-board; C, the beam; D D, the handles; E, the arc for adjusting the handles. It is attached to the handles and rear end of the beam, and consists of two similar parts coupled together by bolts, the handles being extended when the bolts are loosened, allowing them to move along the slots in the arc.

F is a screw, by means of which, or any other suitable device, the land-side is extended from the mold-board, causing the extension of the handles, as above described. The land-side, when extended, turns on the joint $a$, which is constructed as shown in Fig. 2, so as to admit of the motion necessary in adjusting the land-side.

G in Fig. 1 is the wheel for gaging the plow.

I claim as my invention—

1. The land-side A, hinged at its front end to the standard or short land-side, and having its rear end adjustable in or out, substantially as shown and described.

2. The combination of the hinged land-side A, bolt or spreader F, with oppositely-cut screw ends, and mold-board B, substantially as shown and described.

3. The sectional or double arc E, having the slots $e$ and the arc-shaped slot $e'$, and a lug or ear upon each arc, whereby the parts are made laterally adjustable upon each other for spreading the plow-handles, substantially as shown and described.

4. The combination of the hinged land-side A, mold-board B, handles D, double arc E, spreader F, and beam C, substantially as shown and described.

FRANK K. JENNINGS.

Witnesses:
 ASA CLESBY,
 B. BRETT.